March 17, 1964 G. MONNOT ETAL 3,125,077
PROCESS FOR IMPROVING THE OPERATING CONDITIONS OF COMPRESSION
IGNITION ENGINES, THE WORK CYCLE OF WHICH COMPRISES
A SCAVENGING PHASE
Filed Sept. 12, 1960
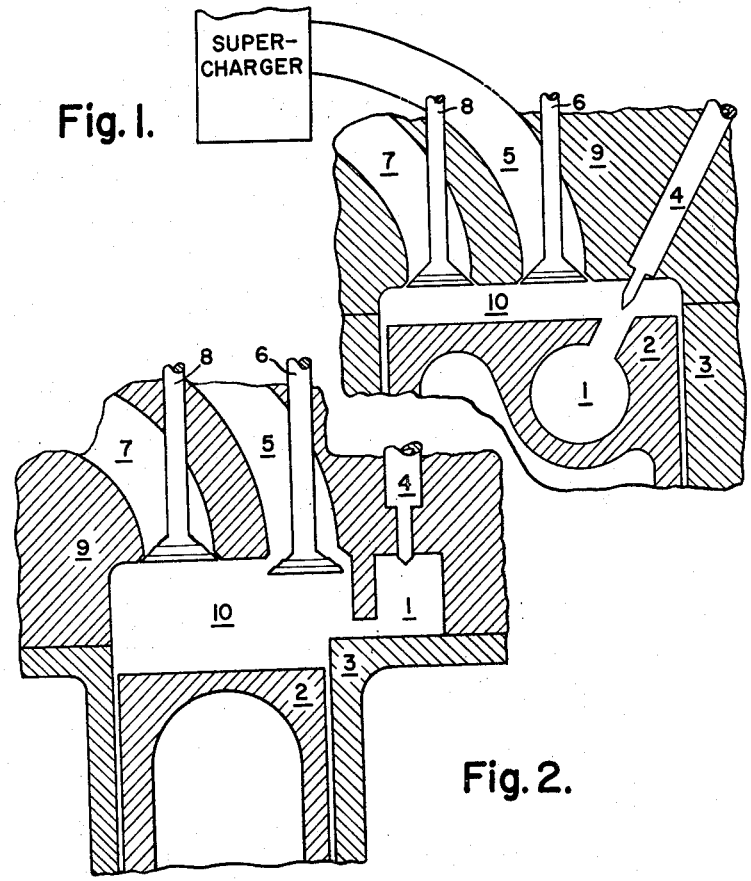
Fig. 1.
Fig. 2.
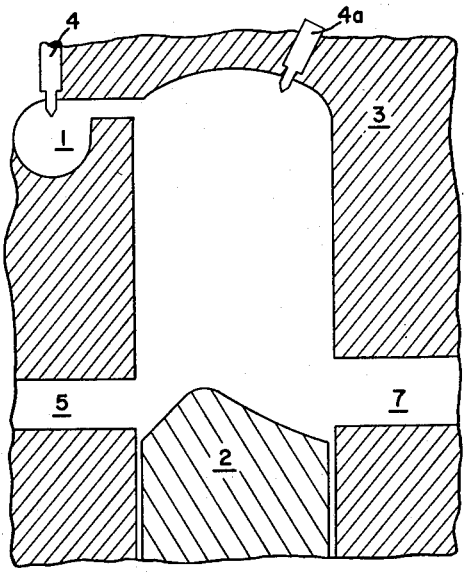
Fig. 3.
INVENTORS
GEORGES MONNOT
ROSTISLAV VICHNIEVSKY
JACQUES OLLIER
GEORGES GROSSHANS
BY
ATTORNEYS

United States Patent Office 3,125,077
Patented Mar. 17, 1964

3,125,077
PROCESS FOR IMPROVING THE OPERATING CONDITIONS OF COMPRESSION IGNITION ENGINES, THE WORK CYCLE OF WHICH COMPRISES A SCAVENGING PHASE
Georges Monnot and Rostislav Vichnievsky, Paris, Jacques Ollier, Neuilly, and Georges Grosshans, Paris, France, assignors to Institut Francais du Petrole, des Carburants et Lubrifiants, Paris, France
Filed Sept. 12, 1960, Ser. No. 55,565
Claims priority, application France Sept. 15, 1959
5 Claims. (Cl. 123—32)

The present invention relates to a process for improving the operating conditions of compression ignition engines, the work cycle of which comprises a scavenging phase.

More in particular, the present invention relates to a process for improving the operating conditions of supercharged compression ignition engines, which is essentially characterized by the fact that the total charge of combustible destined to one cylinder per cycle is introduced into said cylinder in two successive injections by means either of one single or of two separate injectors and that the first of these injections is carried out in the hot residual gases remaining in the cylinder at the end of the exhaust stroke of the preceding cycle and before admixture of a substantial amount of fresh air with the residual gases, the second injection being effected substantially toward the end of the compression stroke.

It has been already established in the United States Patent No. 2,960,079 issued November 15, 1960 and filed May 15, 1958, assigned to the same assignee as the present application, that considerable advantages, such as a smoother combustion regardless of the type of fuel employed and an increased power output at a given rate of pressure increase are obtained by that new double injection method according to which a first "carburating" fraction of the fuel charge is injected into the hot residual gases remaining in the combustion space of the cylinder toward the end of the exhaust stroke of the work cycle and a second, "igniting" injection of the remainder of the fuel charge takes place toward the end of the compression stroke of the next work cycle.

However, such an advantageous method did not seem to be applicable in the case of supercharged engines, due to the effect of the scavenging of the residual gases.

As a matter of fact, the supercharging of compression ignition engines consists of introducing into the latter a combustion-sustaining agent, in most cases air, under superatmospheric pressure, so as to provide for a better filling of the cylinder. This better filling of the cylinder results, in the first place, from a higher pressure of the combustion-sustaining agent; in the second place, from a scavenging of the residual exhaust gases of the preceding work cycle, which scavenging is continued as long as the inlet and outlet valves are kept simultaneously opened; and, in the third place, from the fact that the scavenged burnt gases are replaced by fresh combustion-sustaining gases.

The substantially complete removal of the residual gases, resulting from the scavenging effect, appeared to be incompatible with the carrying-out of the double injection method as heretofore referred to, since the latter method requires the maintenance of a certain amount of residual gases in the combustion space when the first injection is carried out.

It is, therefore, an object of the present invention to apply to supercharged engines of the compression ignition type the double-injection method as described in the patent application hereabove mentioned.

It is another object of our invention to avoid that the supercharging of a compression ignition engine would result in a complete scavenging of the residual burnt gases remaining at the end of the exhaust stroke of the work cycle.

It is a further object of this invention to provide for the maintenance in the cylinder of substantially that part of the residual gases which is necessary for practising under satisfactory conditions the double-injection method heretofore described, while simultaneously taking advantage of the scavenging of the remaining part of the residual gases, for supercharging the engine.

All these objects are accomplished according to the present invention by providing in the walls of the combustion space or chamber and, for instance, in the piston head or in the cylinder head or block, a separate free space or secondary chamber permanently or intermittently communicating with the combustion chamber, but shaped and placed so that the burnt gases contained therein are kept at least partially out of the scavenging zone.

The first injection consisting of the "carburating" fraction preferably amounts to at most 50% of the total fuel charge injected in the cylinder during a complete work cycle and is carried out in said separate free space wherein chemical cracking reactions and/or oxidation reactions may occur between the injected combustible and the residual hot gases having a low oxygen content and a high temperature, as long as no substantial amount of air, admixed thereto, will result in the cooling of the mixture.

On the other hand, the second injection, although it may be carried out in the same free space, is preferably effected in the main combustion chamber.

The minimum proportion of the fuel charge to be introduced into the cylinder by means of the first injection may be as low as desired since, in any case, it is more advantageous to proceed according to the double-injection method than according to the conventional single injection system, even when the "carburating" fraction is very low. However, in the range of 0 to 50% of the total fuel charge, the optimum value of the proportion of the latter to be injected as "carburating" fraction depends in particular on such factors as the kind of fuel used, the shape and the volume of the secondary chamber.

The secondary chamber will be placed so as to open into the main combustion chamber at a location of the latter as remote as possible from the valves and where the turbulence due to the scavenging effect is as low as possible.

The passage through which the two chambers communicate will be chosen narrow enough so as to substantially reduce the scavenging effect in the secondary chamber and large enough for having the benefit of a high efficiency of the engine. The optimum section of said passage will therefore be determined as a compromise between these two requirements. However the ratio of the section of the passage to the section of the secondary chamber taken in a plane substantially perpendicular to the longitudinal axis of said passage must in any case be lower than $\frac{1}{2}$ and is preferably chosen within the range of $\frac{1}{50}$ to $\frac{1}{4}$.

The invention will be better understood with reference to the accompanying drawings which should be considered as being only illustrative of the invention and not as limiting the scope or applicability of the invention.

In the accompanying drawings FIGURE 1 is a somewhat schematic, sectional view and illustrates the housing of a secondary chamber provided in the upper part of the piston and having a substantially spherical shape; FIGURE 2 is a somewhat schematic, sectional view, and illustrates the housing of a secondary chamber provided in the cylinder head and extending from the main combustion chamber laterally, and FIGURE 3 is a somewhat schematic sectional view of a two-stroke engine, illustrating the housing of a secondary or auxiliary chamber of a substantially spherical shape, in the cylinder head.

Referring now more in detail to FIGURE 1, the separate combustion space 1 provided in the piston head 2 is not subjected to the scavenging as said piston moves in the cylinder 3. A single injector 4 provided in the cylinder head 9 is placed substantially in front of this separate combustion space 1, whereas air under pressure is delivered through pipe 5 to the main combustion space 10 during the opening of the inlet valve 6. The burnt gases remaining in the combustion chamber 10 and the scavenging air are evacuated through exhaust pipe 7 when the outlet valve 8 is opened.

FIGURE 2 illustrates another embodiment of the invention which differs from that shown in FIGURE 1 by a different position of the separate space which is excluded from the scavenged zone (said space being positioned in the cylinder head). The like reference numerals of FIGURE 2 designate the same elements as like reference numerals in FIGURE 1.

The operation of the engine will be explained as follows with respect to a four-stroke work cycle:

A first "carburating" fraction of the total fuel charge destined to each cylinder per work cycle is injected by means of injector (4) into the auxiliary combustion chamber (1) located substantially apart from the scavenged zone and freely communicating with the main combustion chamber (10) by means of a narrow passage, this injection being carried out toward the end of the exhaust stage or at the beginning of the suction phase, at a moment where still a significant amount of hot residual gases remains in said auxiliary chamber (1) and prior to the introduction thereinto through said passage of a substantial amount of air or of fresh combustible mixture.

Substantially at the same moment, or slightly before, the burnt gases remaining in the main combustion chamber (10) are forced through pipe 7, outlet valve 8 being opened, the inlet valve 6 opens and compressed air delivered through pipe 5 enters the main combustion chamber 10 and scavenges the residual burnt gases therefrom through pipe 7, whereas the outlet valve 8 is still kept opened. As soon as outlet valve 8 closes, the scavenging effect is stopped, although fresh air still continues to progressively fill up the cylinder during the downward movement of the piston.

In contrast with the foregoing, in the separate space the scavenging effect or dilution by air is considerably lower than in the main combustion chamber 10, so that the residual burnt gases contained therein still possess their oxidizing and/or cracking properties with respect to the liquid fuel injected into said space before or after the scavenging or even during the same. The second "igniting" fraction is preferably injected into the main combustion chamber by means of a second injector (not shown in the figures) toward the end of the compression stage and preferably at a position of the crankshaft prior to top dead center.

The first "carburating" fraction of the liquid fuel is subjected to chemical reactions when contacted with the burnt residual gases, which result in the numerous advantages of the double-injection method, heretofore described, as compared with the conventional single injection process. The advantages are mainly the following:

A more rapid ignition of the main fuel charge;
A more regular combustion;
A smoother operation of the engine;
A reduction of noise and vibrations;
Operability of the engine with combustibles of low cetane number such as, for instance, normal motor gasoline.

The best timing of the first injection during the work cycle will be selected according to the susceptibility of the secondary chamber to the scavenging, which susceptibility depends on the size and the position of the chamber. In any case, the first injection must be carried out not later than at the moment when the piston attains its halfway position of the suction stroke, in the case of a four-stroke engine.

The process of our invention may also be applied with equal success to two-stroke engines, but in that case the first injection must be carried out in the separate space provided out of the scavening zone, toward the end of the exhaust period or the beginning of the suction period and, for instance, from 160° to 190° before the compression top dead center.

FIGURE 3 illustrates the case of a two-stroke engine having a secondary chamber according to this invention. Said secondary chamber 1 is provided in the upper part of the cylinder 3 and has a substantially spherical shape. This secondary chamber escapes the scavenging occuring when the piston 2 is located as shown in FIGURE 3, leaving free passage to introduction of fresh air through the inlet pipe 5 and to exhaust of gases through the exhaust pipe 7. A single injector 4 opens into the secondary chamber. A second injector 4a opens into cylinder 3. During the upper movement of the piston, air introduced through pipe 5 is compressed in the cylinder and the secondary chamber wherein the second fuel fraction is injected. The burnt gases push down the piston and are evacuated through pipe 7 while the scavenging phase occurs. The first injection of the carburating fraction of the fuel charge of the next cycle is effected in the secondary chamber substantially during this scavenging phase in the burnt gases which escape to the scavenging effect due to the location of the secondary chamber.

It will be understood that, while there have been given in the accompanying drawings certain specific examples of the embodiments of this invention, it is not intended thereby to have this invention limited to the specific details of structure, position and shape of the secondary combustion chamber, in view of the fact that this invention may be modified according to individual preference or conditions without necessarily departing from the spirit of this disclosure and the scope of the appended claims.

What we claim is:

1. A method for improving the operating conditions of compression-ignition engines of the diesel type the work cycle of which comprises a scavenging phase, consisting of injecting the total fuel charge destined to each cylinder in two successive fractions per work cycle, the first of which is injected into an auxiliary combustion chamber communicating with the main combustion chamber but positioned substantially apart from the scavenge zone, at a moment where residual gases from the end of the exhaust period are remaining in said auxiliary chamber substantially in the absence of air, the remaining fraction of said fuel charge being injected into the space defined by said two communicating combustion chambers toward the end of the compression period.

2. A method for improving the operating conditions of a four-stroke supercharged compression-ignition engine of the diesel type, consisting of injecting the total fuel charge destined to each cylinder in two successive fractions, per work cycle, the first of which is injected into an auxiliary chamber at the end of the exhaust stroke, substantially in the absence of air, said auxiliary chamber communicating with the combustion chamber but positioned so as to be substantially apart from the scavenging zone, the remaining fraction of said fuel charge being injected into the space as defined by said two communicating chambers toward the end of the compression stroke.

3. A method for improving the operating conditions of a two-stroke compression-ignition engine of the diesel type, consisting of injecting the total fuel charge destined to each cylinder in two successive fractions per work cycle, the first of which is injected into an auxiliary chamber at the end of the exhaust period, substantially in the absence of air which auxiliary chamber communicating with the main combustion chamber but positioned substantially protected from scavenging, the remaining fraction of said fuel charge being injected into the space defined by said two communicating chambers toward the end of the compression period.

4. A method according to claim 1, wherein the first fraction of the total fuel charge amounts to not more than 50 percent of the latter.

5. A method according to claim 3, wherein the first fraction of the total fuel charge amounts to not more than 50 percent of the latter.

References Cited in the file of this patent

UNITED STATES PATENTS

| | | |
|---|---|---|
| 959,951 | L'Orange | May 31, 1910 |
| 1,392,556 | Gottard | Oct. 4, 1921 |
| 2,902,011 | Hoffmann | Sept. 1, 1959 |
| 2,914,042 | Rieseler | Nov. 24, 1959 |
| 2,914,043 | Nallinger | Nov. 24, 1959 |
| 2,960,079 | Monnot et al. | Nov. 15, 1960 |

FOREIGN PATENTS

| | | |
|---|---|---|
| 742,738 | France | Jan. 4, 1933 |